Nov. 13, 1934.    J. C. McCUNE    1,980,420
LOCOMOTIVE BRAKE EQUIPMENT
Filed June 11, 1932
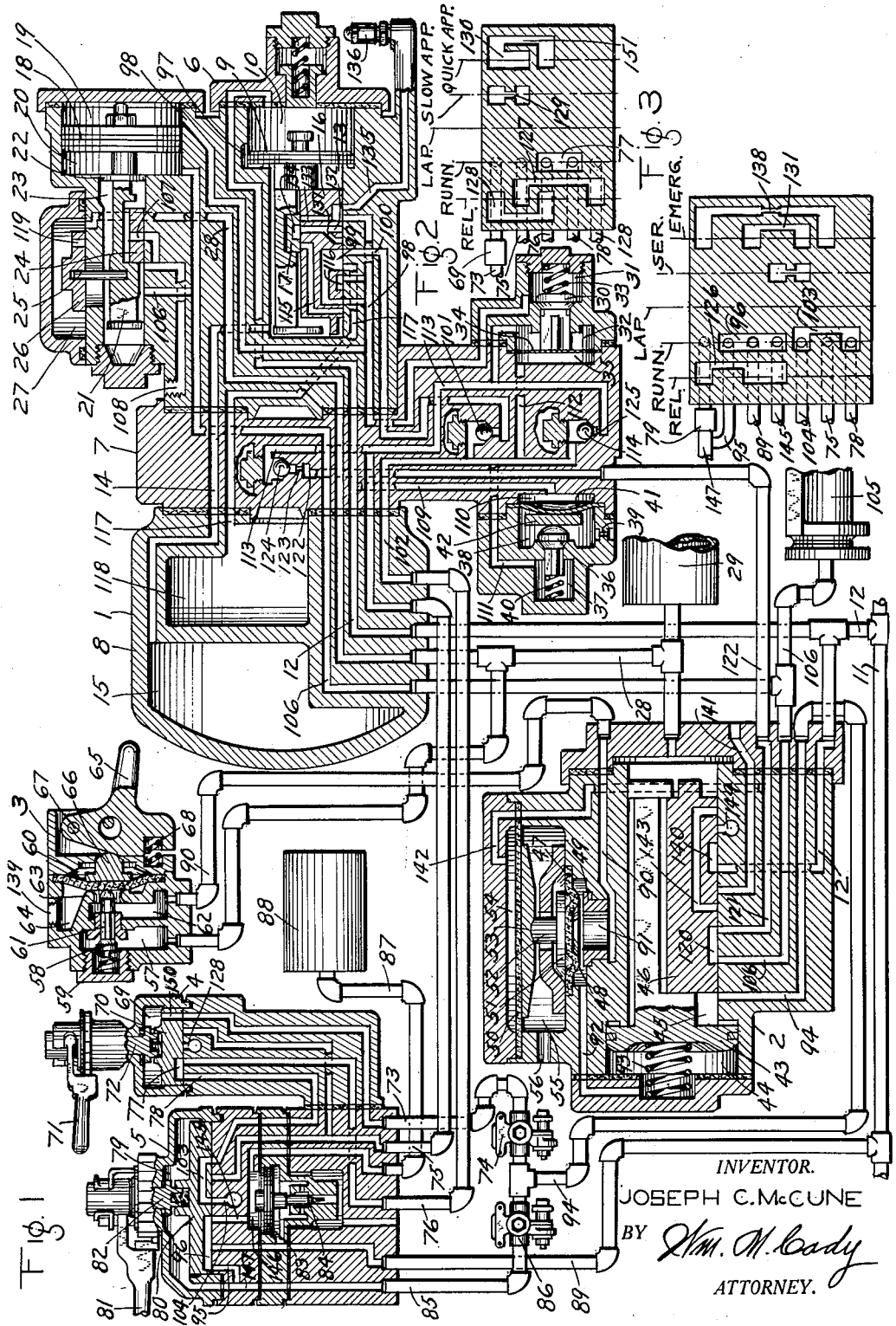
INVENTOR.
JOSEPH C. McCUNE
BY Wm. M. Cady
ATTORNEY.

Patented Nov. 13, 1934

1,980,420

UNITED STATES PATENT OFFICE 1,980,420

LOCOMOTIVE BRAKE EQUIPMENT

Joseph C. McCune, Edgewood, Pa., assignor to The Westinghouse Air Brake Company, Wilmerding, Pa., a corporation of Pennsylvania Application June 11, 1932, Serial No. 616,697

5 Claims. (Cl. 303—40)

This invention relates to fluid pressure brakes, and more particularly to the type employing a distributing valve device such as is used on a locomotive for controlling the locomotive brakes.

The usual distributing valve device such as is employed in the well known ET locomotive brake equipment is adapted to operate in accordance with variations in brake pipe pressure to control the locomotive brakes, and its operation is also controlled by an independent brake valve device independently of variations in brake pipe pressure.

The distributing valve device is provided with an application cylinder pipe through which the locomotive brakes are adapted to be applied and released by operation of the independent brake valve, and a release pipe through which the locomotive brakes are adapted to be released upon an increase in brake pipe pressure.

The usual distributing valve device is provided with an application piston chamber to which fluid under pressure is supplied through the independent brake valve and the application cylinder pipe in effecting an independent application of locomotive brakes.

The release pipe is connected through the slide valve of the usual equalizing valve device, when in release position, with the application cylinder pipe. The release pipe usually extends from one end of a locomotive to the other and thus the rate of build-up of pressure in the application piston chamber through the independent brake valve depends upon and varies with the amount of release pipe volume which is added to said chamber. This is objectionable, especially when it is desired to effect a quick application, in that the rate of build-up of pressure in the application piston chamber, and consequently in the brake cylinder, cannot be definitely fixed and if the rate is satisfactory for a short locomotive, it will be slower on a long locomotive and may not provide the proper rate of retardation.

Means have heretofore been provided, as disclosed in my pending application, Serial No. 373,169, filed June 24, 1929, whereby the application cylinder pipe is cut off from the application piston chamber when an application of the brakes is effected by a reduction in brake pipe pressure, so that fluid under pressure supplied to the application piston chamber does not equalize into the application pipe, and the same means are also adapted to prevent the loss of locomotive brakes upon breakage of the application cylinder pipe. Means are also provided whereby fluid under pressure supplied through the independent brake valve device to the release pipe for releasing the brakes operates the first mentioned means, so as to open communication from the application piston chamber to the application cylinder pipe. However, after an emergency application of the brakes is effected, the locomotive brakes cannot be released independently of the train brakes because the release pipe is vented to the atmosphere by the operation of valve means in the distributing valve device.

One object of my invention is to provide improved means for insuring a fast rate of build-up of brake cylinder pressure on a locomotive when effecting an independent application.

Another object of my invention is to provide improved means by which the brakes on the locomotive may be released independently of the brakes on the train after an emergency application, even in case the application cylinder pipe is broken.

Other objects and advantages will appear in the following more detailed description of my invention.

In the accompanying drawing; Fig. 1 is a diagrammatic view, mainly in section, of a fluid pressure brake equipment embodying my invention; Figs. 2 and 3 are development views showing diagrammatically the connections established in various positions of the rotary valve of the independent brake valve device and of the automatic brake valve device, respectively.

As shown in the drawing, the fluid pressure brake equipment comprises a distributing valve device 1, an application valve device 2, a foot valve device 3, an independent brake valve device 4, and an automatic brake valve device 5.

The distributing valve device 1 comprises the usual valve portion 6 mounted on one face of a filler portion 7, and a reservoir portion 8 mounted on another face of the filler portion 7.

The valve portion of the distributing valve device comprises an equalizing piston 9 having at one side a chamber 10 open to the brake pipe 11 and having a valve chamber 13 at the opposite side connected through passage 14 with the usual pressure chamber 15 and containing a main slide valve 16 and an auxiliary slide valve 17 adapted to be operated by said piston.

The valve portion of the distributing valve device further comprises an application piston 18 having a chamber 19 at one side and a chamber 20 at the other side. The piston 18 is provided with a stem 21 upon which is mounted a baffle piston 22 separating chamber 20 from a valve chamber 23 containing a release slide valve 24 adapted to be operated by the piston 18.

The piston stem 21 is provided with a pin 25 adapted to operate an application slide valve 26 upon movement of the application piston 18. The application slide valve 26 is contained in a chamber 27 which is connected to a passage 28 leading to a main reservoir 29.

Associated with the filler portion 7 is an application cylinder cut-off valve device comprising a valve 30 adapted to control communication between the chambers 31 and 32. Said valve is urged to its seat by means of a spring 33 and is adapted to be unseated by means of a flexible diaphragm 34 having at one side the chamber 32 and at the other side a chamber 35.

Associated with the filler portion 7 is another valve 36 adapted to control communication between a chamber 37 and a chamber 38 which is open to the atmosphere through a restricted passage 39. Said valve is urged away from its seat by means of a spring 40 and is adapted to be seated by means of a flexible diaphragm 41 acting through a follower plate 42.

The application valve device 2 comprises a piston 43 having at one side a chamber 44 and at the opposite side a chamber 45 open through a passage and pipe 28 to the main reservoir 29. A slide valve 46 is contained in the chamber 45 and is adapted to be operated by the piston 43. A spring 93 is provided in the chamber 44 for urging the piston 43 and slide valve 46 to the normal position shown in the drawing.

Associated with the application valve device 2 is a safety control cut-off valve device comprising a flexible diaphragm 47 having a valve seat rib 48 adapted to engage and seal on a rib 49 in the casing, and a flexible diaphragm 50 for deflecting the valve diaphragm 47. Said diaphragms are operatively connected through the medium of a follower plate 51 carried by the diaphragm 47 and having a stem 52 adapted to engage a follower plate 53, which in turn engages the diaphragm 50. A chamber 54 is formed at one side of the diaphragm 50, and a chamber 55 is formed between the diaphragms 47 and 50 and is open to the atmosphere through a passage 56.

The foot valve device 3 comprises a casing having a chamber 57 containing a valve 58 which is urged to its seat by a spring 59. For unseating the valve 58, a flexible diaphragm 60 is mounted in the casing and engages the fluted stem 61 of the valve 58, said stem extending through a partition wall and into a chamber 62. In unseating the valve 58, the diaphragm 60 is deflected into engagement with a seat rib 63 for closing communication between chamber 62 and an atmospheric chamber 64. A foot pedal 65 is provided for deflecting the diaphragm 60 through the medium of a follower member 66, said foot pedal being pivotally carried by a pin 67 in the casing. A spring 68 is provided between the casing and the foot pedal 65 for urging the pedal away from the diaphragm follower 66 upon the relief of manual pressure on the pedal 65.

The independent brake valve device 4 is of the usual type comprising a casing having a chamber 69 containing a rotary valve 70 adapted to be rotated by a handle 71 through the medium of a shaft 72. A pipe 73 leads to the rotary valve seat of the independent brake valve and also to the reducing valve device 74 which may be of any desired construction, and is also connected to the usual application cylinder pipe 75 and distributing valve release pipe 76 in the well-known manner. The distributing valve release pipe is connected, in the position shown in Fig. 1, through a cavity 77 in the rotary valve to a passage 78 leading to the automatic brake valve device 5.

The automatic brake valve device 5 is similar to the usual automatic brake valve device and comprises a casing having a valve chamber 79 containing a rotary valve 80 adapted to be rotated by a handle 81 through the medium of a shaft 82. It also includes the usual equalizing discharge valve mechanism comprising an equalizing piston 83 and an equalizing discharge valve 84 which operate in the usual manner to effect a reduction in brake pipe pressure during an automatic application. The automatic brake valve device is connected to a pipe 85 leading to the usual feed valve device 86, the application cylinder pipe 75, the distributing valve release pipe 76, the pipe 73 leading to the reducing valve device 74, the pipe 87 leading to the usual equalizing reservoir 88, and through a pipe 89 to the brake pipe 11, so that the pressure of fluid in the brake pipe may be varied in the usual manner. The distributing valve release pipe passage 78 from the independent brake valve device leads to the seat of the rotary valve 80 of the automatic brake valve device.

In operation, fluid under pressure is supplied to the main reservoir 29 in the usual manner and flows therefrom through pipe and passage 28 to the application valve chamber 27 of the distributing valve device 1, to valve chamber 45 of the application valve device 2, and to valve chamber 57 of the foot valve device 3.

The foot valve device 3 is a safety device adapted to operate upon incapacitation or inattentiveness of the operator, and the pedal 65 is normally maintained depressed by the foot of the engineer. This deflects diaphragm 60 into engagement with seat rib 63 and unseats valve 58. Fluid at main reservoir pressure then flows from chamber 57 to chamber 62 and from thence through passage and pipe 90 to chamber 91 below the cut-off valve diaphragm 47. The diaphragm valve 48 is normally unseated from rib 49, so that fluid flows from chamber 91 through passage 92 to the application valve piston chamber 44. The fluid pressures are thus balanced on the opposite sides of the application piston 43 and spring 93 maintains said piston and the slide valve 46 in the position shown in the drawing. In this position of slide valve 46, fluid at main reservoir pressure flows from chamber 45 through passage and pipe 94 to the reducing valve device 74 and to the feed valve device 86.

The reducing valve device 74 operates in the usual manner to supply fluid at a reduced pressure to pipe 73 leading through port 150 in the rotary valve of the independent brake valve device 4 to chamber 69. Port 150 registers with passage 73 in all positions of the rotary valve of the independent brake valve device, so as to supply fluid at reducing valve pressure to chamber 69.

The feed valve device operates in the usual manner to supply fluid at a reduced pressure to the pipe 85 leading to the automatic brake valve device 5. A passage 147 leads from the pipe 85 to the rotary valve chamber 79 of the automatic brake valve device so that, in the present instance, said chamber is supplied with fluid from the feed valve device instead of from the usual main reservoir. The brake pipe is also charged, with the automatic brake valve in running position, as shown in Fig. 1, with fluid at feed valve pressure supplied to passage 147, through a branch passage 95, cavity 96 in the rotary valve 80, the passage 145, the chamber 146 and the pipe 87.

From the pipe 11, fluid under pressure flows through pipe and passage 12 to the equalizing piston chamber 10 of the distributing valve device 1. With the equalizing piston 9 in the release position shown in the drawing, fluid under pressure flows from chamber 10 through a feed groove 97 to valve chamber 13 and from thence through passage 14 to the pressure chamber 15, thereby charging said chambers.

With the equalizing slide valve 16 in release position, the application piston chamber 19 is open to the atmosphere through passage 98, cavity 99 in said slide valve, passage 100, past the check valve 101, through passage 102, distributing valve release pipe and passage 76, cavity 77 in the rotary valve 70 of the independent brake valve device 4, passage 78, cavity 103 in the rotary valve 80 of the automatic brake valve device 5 and atmospheric passage 104.

With the application piston chamber 19 at atmospheric pressure, the usual brake cylinder 105 is opened to the atmosphere through pipe and passage 106, release valve chamber 23 of the distributing valve device 1, port 107 in the release slide valve 24 and atmospheric passage 108.

Fluid at brake pipe pressure flows from the brake pipe passage 12 in the distributing valve device through passage 109 to diaphragm chamber 110. The diaphragm 41 is thereby deflected to seat valve 36 so as to cut off communication from chamber 37 to chamber 38, the chamber 38 being at all times open to the atmosphere through a restricted passage 39.

Chamber 37 is open through passage 111 to the distributing valve release pipe 76, which is normally vented, as hereinbefore described. Chamber 35 is open through passage 112 to the distributing valve release pipe 76 and chamber 32 at the opposite side of diaphragm 34 is also open to atmosphere through the application cylinder pipe passage 113, past the check valve 114 and through the distributing valve release passage 102 and pipe 76. This permits spring 33 to seat the cut-off valve 30.

If it is desired to effect an automatic service application of the brakes, the pressure of fluid in the brake pipe 11 is gradually reduced by operation of the brake valve device in the usual, well known manner. The equalizing piston chamber 10 of the distributing valve device 1 being connected to the brake pipe 11 through passage and pipe 12, the pressure of fluid in said chamber reduces and permits the pressure of fluid in the equalizing valve chamber 13 to shift the piston 9 and slide valves 16 and 17 to service position.

In service position of the slide valves 16 and 17, a service port 115 through the slide valve 16 is uncovered by slide valve 17, and said service port registers with passage 98 in the seat of slide valve 16. This permits fluid under pressure to flow from the equalizing valve chamber 13 and the connected pressure chamber 15 to passage 98 and from thence to the application piston chamber 19 and also from passage 98 through cavity 116 in the slide valve 16 to passage 117 leading to an application chamber 118.

The pressure of fluid thus supplied to the application piston chamber 19 shifts the application piston 18 toward the left hand. In moving toward the left, the piston 18 shifts the release slide valve 24 so as to lap the brake cylinder exhaust passage 108, and further movement brings a port 119 in the application slide valve 26 into registry with chamber 23. This permits fluid under pressure supplied from the main reservoir 29 to chamber 27 to flow through port 119 to valve chamber 23 and from thence through passage and pipe 106 to the brake cylinder 105 to apply the brakes.

With the equalizing valves 16 and 17 in service position, the application piston chamber 19 is connected to the safety valve device 136 through passage 98, passages 132 and 133 in the slide valve 16, cavity 134 in the slide valve 17, and passage 135, so as to prevent the build-up of excessive pressure in the application piston chamber, and consequently in the brake cylinder.

Fluid under pressure supplied to passage 98 leading to the application piston chamber 19 and connected with the application chamber 118 also flows to the cut-off valve chamber 31 and since the cut-off valve 30 is normally seated, fluid under pressure equalizes in chamber 31. The cut-off valve 30 thus prevents equalization of fluid under pressure from the application piston chamber 19 and application chamber 118 into passage 113 and the application cylinder pipe 75, which would cause an undesirable reduction in the pressure obtained in the application piston chamber 19 and consequently in the brake cylinder. The length of the application cylinder pipe 75 varies according to the length of the locomotive and if the application cylinder pipe cut-off valve 30 were not employed, the pressure that would be obtained in the application piston chamber for a certain degree of brake pipe reduction would vary as the volume of the application cylinder pipe 75. The cut-off valve 30 prevents such variation in pressure in the application piston chamber 19 by fixing the volume to which fluid is supplied by the equalizing valve device.

The application cylinder pipe 75 is lapped by the rotary valve 70 of the independent brake valve device 4 when said rotary valve is in the running position, as shown in Fig. 1, in which position it is normally carried when the brakes are applied upon a reduction in brake pipe pressure. The application cylinder pipe 75 is also lapped in the automatic brake valve device 5 in all positions except the usual emergency position. Also the usual distributing valve release pipe 76 is connected through rotary valve 70 of the independent brake valve device 4 to passage 78, which is lapped by rotary valve 80 of the automatic brake valve device 5 when said brake valve device is moved out of the usual running position shown in Fig. 1 of the drawings.

Fluid under pressure supplied through pipe 106 to the brake cylinder 105 in the manner hereinbefore described flows from said pipe through cavity 120 in the application slide valve 46 to passage 121 and from thence through pipe and passage 122 and a choke 123 to the lower side of a check valve 124, thence past said check valve and through passage 113 to chamber 32 in which the pressure acts on one side of the cut-off valve diaphragm 34. At the same time, fluid under pressure flows from passage 113 through a choke 125, past check valve 114 to passage 112 leading to chamber 35 on the other side of the diaphragm 34. The diaphragm 34 is thus subject on its opposite sides to fluid at the same pressure, which permits spring 33 to maintain the cut-off valve 30 seated.

Since the release pipe 76 is connected to passage 102, to which fluid under pressure is supplied from passage 113, and since the valve 36 is held seated by the pressure of brake pipe fluid acting upon the diaphragm 41, thereby cutting off communication from the passage 111, leading to the release pipe passage 102, and the atmospheric passage 39, said pipe becomes charged with fluid under pressure from the brake cylinder, so that when it is desired to hold the locomotive brakes applied when releasing the train brakes, fluid under pressure will not flow from the application piston chamber 19 into the release pipe 76 and thus effect a partial undesired release of the locomotive brakes, as will be hereinafter fully described. The application pipe 75 is also charged with fluid pressure from passage 113 which is supplied with fluid under pressure from the brake cylinder. As hereinbefore described, release pipe pressure acts in chamber 35 on diaphragm 34 and tends to unseat the cut-off valve 30, but by supplying fluid under pressure through passage 113 to chamber 32 on the opposite side of said diaphragm, the diaphragm 34 is placed in equilibrium, so that the cut-off valve 30 remains seated.

When the pressure of fluid supplied to valve chamber 23 of the distributing valve device 1, and consequently to the brake cylinder 105, and through passage 106 to application piston chamber 20 builds up to a degree slightly exceeding the pressure of fluid supplied to chamber 19, the application piston 18 is slightly shifted toward the right hand. This movement of piston 18 shifts the application slide valve 26 until port 119 is lapped, so as to prevent further flow of fluid to the brake cylinder. The pressure of fluid thus obtained in the brake cylinder is substantially equal to the pressure of fluid obtained in chamber 19, and as a result the pressure of fluid obtained in the application cylinder pipe 75 and distributing valve release pipe 76 is substantially equal to the pressure obtained in the application piston chamber 19, application chamber 118 and cut-off valve chamber 31, since both of said pipes are charged with fluid under pressure from the brake cylinder in the manner hereinbefore described.

To effect a release of the brakes on the locomotive and cars after an automatic service application, the automatic brake valve device is moved to running position, as shown in Fig. 1, so that fluid at feed valve pressure is supplied to the brake pipe 11 through pipe and passage 85, passage 95, cavity 96 in the rotary valve 80 and passage and pipe 89. The consequent increase in pressure in the equalizing piston chamber 10 shifts the equalizing piston 9 and slide valves 16 and 17 to the release position shown in Fig. 1, in which fluid under pressure flows from piston chamber 10 through feed groove 97 to valve chamber 13 and from thence through passage 14 to the pressure chamber 15, thereby charging said chambers.

Fluid under pressure is vented from the application piston chamber 19 to the atmosphere through passage 98, cavity 99 in the slide valve 16, passage 100, past the check valve 101, through passage 102, the distributing valve release pipe 76, cavity 77 in the rotary valve 70 of the independent brake valve device 4, passage 78, cavity 103 in rotary valve 80 of the automatic brake valve device 5, and atmospheric passage 104. The application chamber 118 being connected through passage 117 to cavity 99 in slide valve 16, through which cavity fluid under pressure is vented from the application piston chamber 19, the chamber 118 is also vented. Fluid under pressure is also vented from the application pipe 75 through passage 113, choke 125, past the check valve 114 and through passage 102 leading to the vented release pipe 76. The supply of fluid under pressure from the brake cylinder 105 through passage 122 to passage 113 connecting to the application cylinder pipe 75, being restricted by choke 123, permits the application pipe 75 and release pipe 76 to be vented in the manner above described.

The venting of fluid under pressure from the application piston chamber 19 permits brake cylinder pressure in chamber 20 to shift the piston 18 and slide valves 24 and 26 to release position in which fluid under pressure is vented from the brake cylinder 105 through pipe and passage 106, release valve chamber 23, port 107 in the release slide valve 24 and atmospheric passage 108, thereby effecting a release of locomotive brakes. The brakes on the cars are released in the well known manner by supplying fluid under pressure to the brake pipe 11 as above described.

After an automatic service application of the brakes is effected, if, instead of releasing the brakes on the locomotive and cars by increasing brake pipe pressure, it is desired to release the brakes on the cars only, the automatic brake valve device 5 is moved to release position. Fluid at feed valve pressure is supplied to the brake pipe 11 through pipe 85, passage 147, chamber 79 in the automatic brake valve device 5, a port 126 in the rotary valve 80, and passage and pipe 89. The increase in brake pipe pressure shifts the equalizing piston 9 and slide valves 16 and 17 to release position as hereinbefore described, but due to the release pipe 76 being lapped in the automatic brake valve device 5, a release of the locomotive brakes does not occur, or in other words, the locomotive brakes are held applied while the brakes on the cars are being released by an increase in brake pipe pressure. As hereinbefore described, the release pipe 76 and passage 102, and the application pipe 75 and passage 113 are charged with fluid from the brake cylinder in effecting an application of the brakes. Due to the release pipe being charged, a reduction in pressure in the application piston chamber 19 does not occur upon connecting said chamber to the release pipe 76 through the equalizing slide valve 16 in release position. In other words, the locomotive brake cylinder pressure is held at the degree obtained in the application until the release of fluid from the brake cylinder is intentionally effected by movement of the automatic brake valve device to the running position, as hereinbefore described.

After an automatic service application of the brakes is effected, if, instead of releasing the brakes on the train by supplying fluid under pressure to the brake pipe 11, it is desired to release the brakes on the locomotive independently of the brakes on the cars, the independent brake valve device 4 is moved to release position.

In release position of the independent brake valve device, a cavity 127 in the rotary valve 70 connects the application pipe 75 with the atmospheric passage 128, and the pipe 75 being connected by passage 113 to chamber 32, fluid is vented from said chamber and from one side of the diaphragm 34 in the distributing valve device. The release pipe 76 is connected through a port 128 in the rotary valve 70 to chamber 69 which is supplied with fluid under pressure through pipe 73 from the reducing valve 74. The release pipe 76 being charged with fluid under pressure from the brake cylinder 105 in effecting a service application of the brakes as hereinbefore described, fluid under pressure flows from the reducing valve device to said pipe only if the pressure in said pipe is less than the pressure of fluid supplied by the reducing valve device. If the pressure already in the release pipe 76 is not less than that supplied by the reducing valve device, fluid under pressure from the reducing valve device acts merely to maintain the pressure in said pipe.

Since the release pipe 76 communicates through passage 102 with chamber 35 in the distributing valve device, release pipe pressure acts on one side of the diaphragm 34. The pressure in chamber 32 at the opposite side of the diaphragm 34 being reduced, as above described, said diaphragm is deflected by the pressure in chamber 35 so as to unseat the cut-off valve 30.

Unseating of the cut-off valve 30 vents fluid under pressure from the application piston chamber 19 by way of passage 98, cut-off valve chamber 31, and past the cut-off valve 30 to chamber 32 which is open through the application pipe 75 as above described. Venting of fluid from the application piston chamber 19 permits brake cylinder pressure in chamber 23 to operate said piston to effect a release of fluid under pressure from the brake cylinder 105.

The check valve 114 is provided to prevent flow of fluid under pressure from the release pipe passage 102 to the application pipe passage 113, through which fluid is vented in effecting an independent release of the locomotive brakes.

In effecting an independent release of the locomotive brakes, the check valve 101 prevents flow of fluid under pressure from the release pipe passage 102 to passage 100, which communicates through cavity 99 in the equalizing slide valve 16 with passage 98 from the application piston chamber 19. If such flow were permitted, it would tend to prevent the release of the brakes, to the extent that the pressure in the application piston chamber might be built up by such flow.

To apply the locomotive brakes independently of the train brakes, the independent brake valve device 4 is moved to either slow application or quick application position, depending upon whether it is desired to effect a slow or a quick application.

In slow application position of the independent brake valve device 4, a restricted port 129 in the rotary valve 70 connects the rotary valve chamber 69 to the application pipe 75, so that fluid supplied from the reducing valve device 74 to chamber 69 flows to the application pipe 75 and thence flows through passage 113 to chamber 32, unseating the cut-off valve 30 against the opposing pressure of the light spring 33. Fluid under pressure supplied to chamber 32 then flows past said valve to chamber 31 and from thence through passage 98 to the application piston chamber 19. The piston 18 is thereby operated to supply fluid under pressure to the brake cylinder 105, as hereinbefore described. Due to the restriction in the port 129 in the rotary valve 70, the pressure of fluid in the application piston chamber will increase at a relatively slow rate and this will effect a slow build-up of fluid pressure in the brake cylinder 105.

The release pipe 76, passage 102 and chamber 35 are charged with fluid under pressure from the application pipe passage 113 by flow past the check valve 114 and also by flow from passage 98 through cavity 99 in the equalizing slide valve 16, passage 100 and past the check valve 101, so that the diaphragm 34 will be immediately responsive to a reduction in pressure in chamber 32 in effecting an independent release of the brakes, as has been hereinbefore described.

In quick application position of the independent brake valve device 4, a relatively large port 130 in the rotary valve 70 connects the rotary valve chamber 69 to the application pipe 75, so that fluid supplied from the reducing valve device 74 flows to the application piston chamber 19, as above described, at a rapid rate, thereby effecting a rapid increase of fluid pressure in said chamber and consequently in the brake cylinder 105.

It will be noted from the foregoing that in slow application position of the independent brake valve device, the release pipe 76 is charged with fluid under pressure from the application pipe 75 through which, at this time, fluid under pressure is also supplied at a slow rate, due to the restricted port 129 in the rotary valve 70 of the independent brake valve device 4, to the application piston chamber 19. The release pipe volume thus added to the application pipe will, therefore, act to still further retard the rate of build-up of fluid pressure in the application piston chamber, resulting in a slow application of locomotive brakes. On the other hand, in quick application position of the independent brake valve device, the release pipe, passages 102 and 112, and chamber 35 are charged with fluid under pressure direct from the rotary valve chamber 69 of the independent brake valve device through a port 151 in the rotary valve 70, independent of the application pipe, so that fluid supplied to the application pipe through the independent brake valve device will equalize at a rapid rate into the application piston chamber 19. This rapid equalization of pressures in the application pipe and the application piston chamber, combined with the rapid rate of fluid supply to the application pipe, results in a quick application of the locomotive brakes.

By independently charging the release pipe in quick application position of the independent brake valve device, it becomes unnecessary to provide the large supply ports and passages in the independent brake valve device and in the distributing valve device, which would be necessary in effecting a quick application if the release pipe were charged from the application pipe as in slow application position. Thus, by eliminating the necessity for large supply ports and passages, the size of said valve devices, and therefore the space occupied by them, as well as the cost of material entering into them, is reduced to a minimum.

In effecting an independent application of the brakes, the check valve 124 prevents flow of fluid from the application pipe 75 and passage 113 to passage 122 connecting to the brake cylinder 105.

If desired, the locomotive brakes may also be released after an independent application of the brakes, by moving the independent brake valve device to running position, in which position the release pipe 76 is open to the atmosphere through the cavity 77 in the rotary valve 70 of the independent brake valve device, passage 78, cavity 103 in the rotary valve 80 of the automatic brake valve device 5 and the atmospheric passage 104. Under this condition, fluid is vented from the application piston chamber 19 through passage 98, cavity 99 in the equalizing slide valve 16, through passage 100, past the check valve 101, through passage 102 and then through the release pipe 76.

To effect an emergency application of the brakes, the automatic brake valve device 5 is moved to emergency position, in which position fluid under pressure in the brake pipe 11 is vented rapidly through the pipe and passage 89, passage 131 in the rotary valve 80, and the atmospheric passage 104. The equalizing piston 9 and slide valves 16 and 17 are, therefore, moved to emergency position in which fluid is supplied from the pressure chamber 15 to the application piston chamber 19 directly from valve chamber 13, past the end of the slide valve 16 to passage 98 leading to the piston chamber 19. Passage 117 from the application chamber 118 is lapped by the slide valve 16, so that fluid pressure equalizes from the pressure chamber 15 only into the application piston chamber 19. The application portion of the distributing valve device is then operated to supply fluid under pressure to the brake cylinder 105 as hereinbefore described. The application piston chamber 19 is also connected to the safety valve 136 through passage 98, the restricted passage 137 in the equalizing slide valve 16, passage 132 in said slide valve, and passage 135, so that the safety valve will prevent the build-up of excessive pressure in the application piston chamber.

In emergency position of the automatic brake valve device 5, fluid at feed valve pressure is supplied from the rotary valve chamber 79 of said device to the application pipe 75 through the restricted port 138 in the rotary valve 80. Fluid under pressure thus supplied to the application pipe flows through passage 113 in the distributing valve device to the chamber 32. Fluid under pressure is supplied to the passage 113 and thence to chamber 32 also from the brake cylinder 105 in the same manner as when a service application of the brakes is effected.

The chamber 32 and passage 113 are connected through the choke 125 past check valve 114 to the release pipe passage 102 and thence through passage 111 to chamber 37 at the left of valve 36. The chamber 110, being connected to the brake pipe 11 through passage 109 and passage and pipe 12, is vented and when the pressure in said chamber has been thus reduced to a predetermined low degree, say thirty-five pounds, the valve 36 will be unseated by the pressure of the fluid in chamber 37 plus the light pressure of the spring 40. In this manner, chamber 37 is connected to chamber 38 and thence to the atmosphere through the restricted passage 39, and since chamber 32 is connected to chamber 37, as described above, the chamber 32 is likewise vented to the atmosphere. The pressure maintained in chamber 32 will depend upon the supply capacity of the restricted port 138 in the rotary valve 80 of the automatic brake valve device 5 and of the choke 123 in the distributing valve device and upon the venting capacity of the chokes 125 and 39.

If the pressure of the fluid in chamber 32 becomes a degree greater than the pressure of the fluid in chamber 31 plus the light pressure of the spring 33, the valve 30 will be unseated and fluid under pressure will be supplied from chamber 32 to chamber 31 and thence through passage 98 to the application piston chamber 19. Fluid supplied to passage 98 will also flow through the restricted passage 137 in the equalizing slide valve, port 132 in said valve, and passage 135 to the safety valve device 136. If the pressure of the fluid in the application piston chamber exceeds the pressure adjustment of the safety valve device, said device will operate to reduce said pressure, until the rate at which fluid under pressure is vented from the application piston chamber by way of the safety valve device becomes substantially equal to the rate at which fluid under pressure is supplied from the chamber 32, after which time the safety valve device will continue to vent fluid under pressure from the application piston chamber without effecting a reduction in pressure. In other words, the safety valve device will operate to reduce the pressure of the fluid in the application piston chamber until a balance is established between the rate at which fluid is supplied to and vented from said chamber, after which the balance will be maintained as long as the supply is continued.

Inasmuch as the relation between the above mentioned rate of supply and the venting capacity of the restricted passage 137 in the equalizing slide valve 16 determines the pressure at which the above mentioned balance will be maintained, it is obvious that the greater the rate of supply, the greater will be the pressure balance. Therefore, since the rate of supply depends upon the pressure of the fluid in the rotary valve chamber 79 of the automatic brake valve device 5, it will be seen that the balanced pressure in the application piston chamber, and consequently the pressure of the fluid supplied to the brake cylinder, will depend upon and vary with the pressure of the fluid supplied from the feed valve device. That is to say, since the pressure adjustment of the feed valve device determines the pressure of the fluid supplied to the brake pipe, or nominal brake pipe pressure, brake cylinder pressure during an emergency application of the brakes will vary with nominal brake pipe pressure.

It will be noted that if the passage 39 were not restricted, an independent release of the locomotive brakes after an emergency application could not be effected for the reason that fluid under pressure supplied by the operation of the independent brake valve device 4 to chamber 35 for deflecting diaphragm 34 to unseat the cut-off valve 30 could not be built up in said chamber sufficiently to deflect said diaphragm, because said chamber would be vented to the atmosphere at an unrestricted rate through passage 112, release pipe passage 102, passage 111, chamber 37, past valve 36 to chamber 38 and thence to the atmosphere through the passage 39.

If the application pipe 75 is broken when an emergency application of the brakes is effected, the locomotive brakes may be independently released by moving the independent brake valve device 4 to release position in which fluid under pressure is supplied to the chamber 35 through the release passage and pipe 76, and passages 102 and 112. The pressure of the fluid in chamber 35 acting on diaphragm 34 will cause the cut-off valve 30 to be unseated, the chamber 32 at the opposite side of the diaphragm 34 being vented through the broken application pipe 75, and this will effect release of the locomotive brakes.

Since the chamber 110 is vented to the atmosphere, as hereinbefore described, in effecting an emergency application, fluid under pressure supplied to the release pipe passage 102 for releasing locomotive brakes, as above described, is vented to the atmosphere at a slow rate through passage 111, chamber 37, past check valve 36, chamber 38 and the restricted passage 39. The capacity of the restricted passage 39 is such that the rate at which passage 102 is vented is slower than the rate at which fluid under pressure is supplied to said passage and, therefore, sufficient pressure is built up in chamber 35 to deflect the diaphragm 34 so as to unseat the valve 30 and thereby effect an independent release of the locomotive brakes.

If the application pipe 75 should break after having effected an emergency application of the brakes, fluid under pressure will be vented from chamber 32. Since the chamber 110 at the right of diaphragm 41 is vented during an emergency application of the brakes, release pipe pressure in chamber 35 will unseat valve 36 and thus vent to the atmosphere. This venting of fluid from chamber 35 prevents diaphragm 34 from being deflected against the reduced pressure in chamber 32 and unseating the cut-off valve 30 which would cause an undesired release of the brakes.

If the application pipe 75 is or should become broken, there will be leakage of fluid under pressure from the brake cylinder past the check valve 124 and through the application pipe 75 to the atmosphere, but such leakage is rendered inappreciable by the introduction of the choke passage 123 which restricts the leakage flow.

If the application pipe 75 should become broken after a service application of the brakes is effected, the locomotive brakes will release because the cut-off valve 30 will be unseated by release pipe pressure in chamber 35 acting on diaphragm 34, the chamber 32 at the opposite side of the diaphragm 34 being vented through the broken application pipe 75. As hereinbefore described, the valve 36 is held seated when a service application of the brakes is effected by action of the brake pipe pressure in chamber 110 on diaphragm 41, fluid under pressure being supplied to chamber 110 from the brake pipe 11 through pipe and passage 12 and passage 109.

To prevent such an undesired release of the brakes, the operator effects a sudden reduction in brake pipe pressure to cause an emergency application of the brakes. As a result, fluid at brake pipe pressure is vented from chamber 110 so as to permit release pipe pressure in chamber 37 and the pressure of spring 40 to unseat valve 36 and to flow past said valve to chamber 38 and thence through passage 39 to the atmosphere. This causes the opposing pressures on the cut-off valve diaphragm 34 to become substantially balanced so that the fluid pressure in cut-off valve chamber 31, in addition to the pressure of spring 33, will seat the cut-off valve 30 and thus prevent venting of fluid under pressure from the application piston chamber 19. The pressure of fluid supplied to chamber 19 will then operate the application portion of the distributing valve device to apply the locomotive brakes in the manner hereinbefore described.

If the application pipe 75 should be broken before an application of the brakes is initiated, an emergency application of the brakes can be effected in the same manner as hereinbefore described. Also, a service application of the brakes can be effected, if desired, since diaphragm chamber 35 will not be supplied with fluid under pressure from passage 113 for unseating the cut-off valve 30, on account of passage 113 being vented through the broken application pipe.

If the distributing valve release pipe 76 should be broken or become broken, fluid under pressure will leak from passage 113 and thus from the application pipe 75 through choked passage 125 to passage 102 connecting to the release pipe 76, but the leakage is so restricted by said choked passage 125 that there will be no appreciable loss of fluid pressure in effecting an independent application of the brakes. It will be noted, however, that with the release pipe 76 broken, an independent release of the brakes cannot be effected, but the brakes may be released by an increase in brake pipe pressure, as hereinbefore described.

When the train is running and the brakes remain released, the engineer must maintain the pedal 65 depressed by the pressure of his foot.

If, while the brakes are released, the engineer should remove his foot from the pedal 65, as for instance due to his becoming incapacitated, then the spring 59 will act to seat the valve 58 and the diaphragm 60 will be moved away from the seat rib 63.

The seating of valve 58 cuts off the supply of fluid under pressure to the application piston chamber 44, while the movement of diaphragm 60 permits venting of fluid under pressure from chamber 44 to the atmosphere through passage 92, past the diaphragm seat rib 48 to chamber 91 and from thence through passage and pipe 90, chamber 62 in the foot valve device, past the diaphragm 60 and to the atmosphere through chamber 64, which chamber is open to the atmosphere through passage 139.

The venting of fluid under pressure from the application piston chamber 44 permits main reservoir pressure in valve chamber 45 to move the application piston 43 and slide valve 46 to emergency application position in which the brake pipe 11 is opened to the atmosphere through passage 12, cavity 140 in said slide valve and atmospheric passage 141. Fluid under pressure is thereby suddenly vented directly from the brake pipe to the atmosphere and causes an emergency application of the brakes to be effected. Passage 94 is lapped by the slide valve 46 so as to cut off the supply of fluid to the feed valve device 86 and thereby prevent loss of fluid under pressure through the vented brake pipe by way of the automatic brake valve device 5, which is in running position. Lapping of passage 94 also cuts off the supply of fluid under pressure to the reducing valve device 74 and from thence to the independent brake valve device 4 for reasons which will be hereinafter explained. Passage 106 from the brake cylinder 105 is disconnected from passage 121, so that fluid under pressure is not supplied from the brake cylinder to the application pipe 75 nor to the release pipe 76, as in effecting an application of the brakes by operation of the brake valve device 5. This is desirable, since with the supply of fluid under pressure cut off from the rotary valve chambers 69 and 79 of the independent and automatic brake valve devices, if fluid under pressure were supplied to the application pipe and the release pipe, the pressure in said pipes, acting on the seating face of the rotary valves 70 and 80 might lift said rotary valves and permit fluid under pressure to be vented from said pipes to the atmosphere through the passages 128 and 104, and the flow of fluid between the rotary valves and their seats might carry dirt or other foreign material onto the seats which would later prevent proper operation of the rotary valves.

With the application slide valve 46 in emergency position, diaphragm chamber 54 is connected to the atmosphere through passages 142 and 121, port 143 in said slide valve and atmospheric passage 144. This ensures seat rib 48 of diaphragm 47 remaining out of engagement with the valve seat 49, so that a release of brakes can be effected in the following manner.

To release the brakes after an emergency application caused by operation of the foot valve device 3, the pedal 65 is depressed to deflect diaphragm 60 into engagement with seat rib 63 and to unseat valve 58. This permits fluid under pressure to flow to pipe 90 and from thence through the diaphragm cut-off valve chamber 91 and passage 92 to the application piston chamber 44. The application piston 43 and slide valve 46 are thereby moved to release position, in which fluid under pressure is again supplied to the independent brake valve device 4, which may then be operated in the manner hereinbefore described to effect a release of the brakes.

It will be noted that if the seat rib 48 on diaphragm 47 were not maintained away from the casing seat 49 by opening the diaphragm chamber 54 to the atmosphere, it would be impossible to supply fluid to the application piston chamber 44 to effect a release of the brakes.

When an application of the brakes is effected by operation of either the automatic brake valve device 5 or independent brake valve device 4 in the manner hereinbefore described, fluid under pressure is supplied to the diaphragm chamber 54 by flow from the brake cylinder passage 106 through cavity 120 in the application slide valve 46 and passages 121 and 142. When the pressure in chamber 54 is increased sufficiently to deflect diaphragm 50, the diaphragm valve 47 will be shifted by movement of the diaphragm 50, so that the seat rib 48 will engage the rib 49. Connection from pipe 90 to passage 92 is thus cut off, so that the operator may remove his foot from pedal 65 after having effected a predetermined application of the brakes, without causing the application valve device 2 to operate. However, before the brakes are released after an application, the pedal 65 must be again depressed, so that when diaphragm 50 deflects and moves seat rib 48 away from rib 49 upon the relief of fluid pressure in diaphragm chamber 54, an undesired emergency application of the brakes will not be effected.

From the foregoing description of the operation of the improved brake equipment, it will be noted that a rapid build-up of locomotive brake cylinder pressure is provided, when the independent brake valve device is moved to quick application position, by charging the release pipe independently of the application pipe instead of by way of the application pipe. It will also be seen that it is possible for the engineer to effect an independent release of locomotive brakes, even in the event of a broken application pipe, for the reason that the rate at which fluid under pressure is vented from the release pipe through the restricted passage 39 is slower than the rate at which fluid under pressure is supplied to the release pipe when effecting an independent release of locomotive brakes and this results in a build-up of fluid pressure in chamber 35 sufficient to unseat the cut-off valve 30 so as to vent the application piston chamber 19.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, of an application supply pipe, a release pipe, a valve device operated by an increase in fluid pressure in said supply pipe for effecting the supply of fluid under pressure to the brake cylinder and operated by a reduction in fluid pressure in said release pipe for effecting the release of fluid from the brake cylinder, and a brake valve device comprising a valve having an application position for establishing one communication through which fluid under pressure is supplied to a passage leading to said application supply pipe and for establishing another communication through which fluid under pressure is simultaneously supplied to a passage leading to said release pipe.

2. In a fluid pressure brake, the combination with a brake cylinder, of a valve device having an application chamber and operated upon an increase in fluid pressure in said chamber for effecting the supply of fluid under pressure to the brake cylinder and upon a release of fluid from said chamber for effecting the release of fluid from the brake cylinder, an application pipe through which fluid under pressure is supplied to said chamber, a release pipe through which fluid is released from said chamber, and a brake valve device comprising a valve having an application position in which fluid under pressure is simultaneously supplied to separate passages leading respectively to said application pipe and to said release pipe.

3. In a fluid pressure brake, the combination with a brake cylinder, of a valve device having an application chamber and operated upon an increase in fluid pressure in said chamber for effecting the supply of fluid under pressure to the brake cylinder and upon a release of fluid from said chamber for effecting the release of fluid from the brake cylinder, an application pipe through which fluid under pressure is supplied to said chamber, a release pipe through which fluid is released from said chamber, and a brake valve device having a quick application position in which fluid under pressure is supplied to said application pipe and to said release pipe and a slow application position in which fluid under pressure is supplied only to said application pipe and in which fluid under pressure is supplied to the release pipe from said application pipe.

4. In a fluid pressure brake, the combination with a brake cylinder, of a valve device having an application chamber and operated upon an increase in fluid pressure in said chamber for effecting the supply of fluid under pressure to the brake cylinder and upon a release of fluid from said chamber for effecting the release of fluid from the brake cylinder, an application pipe through which fluid under pressure is supplied to said chamber, a release pipe through which fluid is released from said chamber, and a brake valve device having a quick application position in which fluid under pressure is supplied at a rapid rate to said application pipe and in which fluid under pressure is supplied by said brake valve device to said release pipe, said brake valve device having a slow application position in which fluid under pressure is supplied to said application pipe at a slow rate, while fluid under pressure is supplied to the release pipe only from the application pipe.

5. In a fluid pressure brake, the combination with a brake pipe, a brake cylinder, and a valve device operated by an increase in fluid pressure for effecting the supply of fluid under pressure to the brake cylinder and upon a release of fluid pressure for effecting the release of fluid from the brake cylinder, of an application pipe through which fluid under pressure is supplied to said valve device, a release pipe through which fluid is released from said valve device, valve means operated by brake pipe pressure for closing a communication through which fluid is vented to the atmosphere from said release pipe, said communication being opened upon a predetermined reduction in brake pipe pressure, a valve mechanism operated by an increase in pressure in the application pipe for connecting the release pipe with the application pipe, and means for restricting the release of fluid from the release pipe through said communication to permit the build up of pressure in the release pipe, when the brake pipe pressure is so reduced that said valve means opens communication from the release pipe to the atmosphere.

JOSEPH C. McCUNE.